United States Patent Office 3,506,653
Patented Apr. 14, 1970

3,506,653
NON-STEROID HORMONAL AGENTS
John H. Fried, Palo Alto, Calif., assignor to Syntex Corporation, Panama, Panama, a corporation of Panama
No Drawing. Filed Sept. 12, 1966, Ser. No. 578,442
Int. Cl. C07c 15/24
U.S. Cl. 260—240                         13 Claims The present invention relates to novel compounds possessing pharmacological properties associated with steroidal hormonal agents. The new non-steroidal hormonal agents are benzylidene derivatives of aromatic compounds containing two fused rings. More particularly, these agents are benzylidene and p-substituted benzylidene derivatives of 1-(2H)-3,4-dihydronaphthalene. The compounds of the present invention are represented by the following formula:

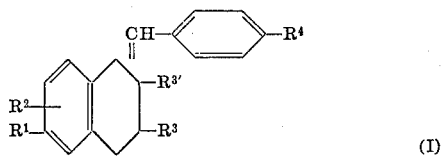

(I)

wherein $R^1$ is hydrogen, hydroxy, lower alkoxy, cycloalkoxy, 2-dialkylaminoethoxy, 2-piperidinoethoxy, 2-pyrrolidinoethoxy, 2-morpholinoethoxy or tetrahydropyran-2′-yloxy;

$R^2$ is hydrogen, lower alkyl, chloro or fluoro;

each of $R_3$ and $R_3'$ independently is hydrogen or lower alkyl; and $R^4$ is hydrogen, hydroxy, lower alkoxy, cycloalkoxy, 2-dialkylaminoethoxy, 2-piperidinoethoxy, 2-pyrrolidinoethoxy, 2-morpholinoethoxy or tetrahydropyran-2′-yloxy.

By the term lower alkoxy is meant a straight chain carbon atom group containing from 1 to 4 carbon atoms, inclusive, such as methoxy, ethoxy, propoxy and butoxy. By the term cycloalkoxy is meant a saturated ring carbon group containing 5 or 6 carbon atoms, such as cyclopentyloxy and cyclohexyloxy. By the term alkyl in 2-dialkylaminoethoxy is meant a straight chain carbon atom group containing from 1 to 4 carbon atoms inclusive. Thus, 2-dialkylaminoethoxy includes 2-dimethylaminoethoxy, 2-diethylaminoethoxy, 2-dipropylaminoethoxy and 2-dibutylaminoethoxy.

The novel compounds of the present invention are prepared by the following process:

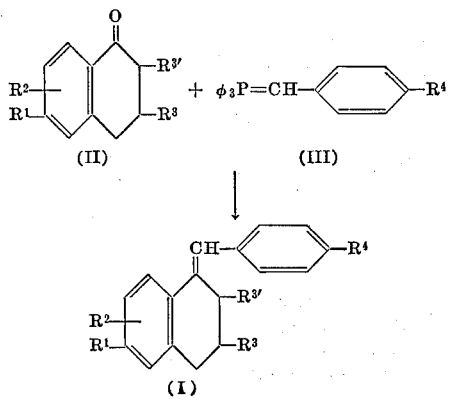

wherein all substituents are as previously defined hereinabove.

In carrying out the process, a 3,4-dihydronaphthalenone of Formula II is reacted with a Wittig reagent of Formula III in the absence of a solvent at about 250° C. to afford the novel hormonal agents represented by Formula I of the present invention. Alternatively, the 3,4-dihydronaphthalenone of Formula II and the Wittig reagent of Formula III are refluxed in a high boiling, inert organic solvent such as xylene, diphenyl ether, diethyleneglycol dimethyl ether, triethyleneglycol dimethyl ether or the like for a period of about twenty-four hours to afford the novel compounds of Formula I.

Alternatively, the $R^1$ and $R^4$ substituents, in a compound of Formula I, as lower alkoxy, cycloalkoxy, 2-dialkylaminoethoxy, 2-piperidinoethoxy, 2-pyrrolidinoethoxy, 2-morpholinoethoxy or tetrahydropyran-2′-yloxy, are introduced subsequent to the above reaction of the present invention via conventional techniques by treating the corresponding compound of Formula I, wherein $R^1$ and/or $R^4$ are hydroxy, with an appropriate reagent. For example, a lower alkoxy or cycloalkoxy substituent is introduced by treatment of the hydroxy compound with sodium or potassium carbonate in acetone followed by the addition of the alkoxy or cycloalkoxy halide, preferably the chloride. A 2-dialkylaminoethoxy, 2-piperidinoethoxy, 2-pyrrolidinoethoxy, or a 2-morpholinoethoxy substituent is introduced by treatment of the hydroxy compound with β-chloroethylamine in methanol containing sodium methoxide. Thus, the alkylation of the hydroxy compound is effected by treating the sodium salt with β-chloroethyldialkylamine, β-chloroethylpiperidine, β-chloroethylpyrrolidine, or β-chloroethylmorpholine, respectively. The tetrahydropyran-2-yloxy substituent is introduced by treating a corresponding hydroxy compound with dihydropyran in the presence of an inert solvent such as p-toluenesulfonic acid or p-toluenesulfonil chloride in an inert solvent such as benzene.

Alternatively, the novel compounds of the present invention are prepared by the following process:

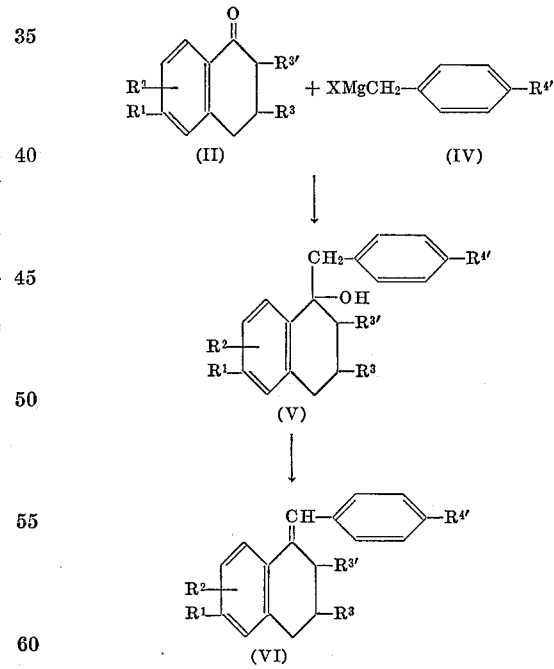

wherein X is chloro or bromo;

$R^{4'}$ is hydrogen, lower alkoxy, cycloalkoxy, 2-dialkylaminoethoxy, 2-piperidinoethoxy, 2-pyrrolidinoethoxy 2-morpholinoethoxy, or tetrahydropyran-2′-yloxy; and all other substituents are as previously defined.

In carrying out the alternative process, a 3,4-dihydronaphthalenone of Formula II is reacted with a Grignard reagent of Formula IV in an inert, anhydrous solvent such as tetrahydrofuran, diethyl ether or the like to afford a novel tertiary carbinol intermediate of Formula V. The carbinol intermediate of Formula V is then dehydrated by treatment with thionyl chloride in pyridine at room temperature for a period of about one hour to afford the novel compounds of Formula VI of the present invention.

Alternatively, the $R^1$ substituent, in a compound of Formula VI, as lower alkoxy, cycloalkoxy, 2-dialkylaminoethoxy, 2 - piperidinoethoxy, 2-pyrrolidinoethoxy, 2-morpholinoethoxy, or tetrahydropyran-2'-yloxy, is introduced subsequent to the above second process of the present invention via conventional techniques by treating the corresponding compound of Formula VI wherein $R^1$ is hydroxy with an appropriate reagent as described hereinabove.

The novel compounds of Formula I demonstrate estrogenic and anti-estrogenic activities. Those compounds of Formula I, wherein either $R^1$, $R^4$, or both $R^1$ and $R^4$ is 2-dialkylaminoethoxy, 2-pyrrolidinoethoxy, 2-piperidinoethoxy or 2-morpholinoethoxy, have pronounced anti-estrogenic activity and are useful as anti-fertility agents, for lowering blood cholesterol levels and for inhibiting steroidal biosynthesis. Those compounds of Formula I, wherein either $R^1$, $R^4$, or both $R^1$ and $R^4$ is hydrogen, hydroxy, lower alkoxy, cycloalkoxy, or tetrahydropyran-2'-yloxy have estrogenic activity and are useful in causing weight gains in animals and treatment of uterine disorders. The novel hormonal agents of the present invention are administered via usual routes, i.e. orally or parenterally in pharmaceutically acceptable compositions at dosage rates of from 0.5γ to 5 mg./kg./day. However, dosage rates below or above this range can also be used; the most favorable dosage rate and administration route being conditioned upon the purpose for which it is administered and the response thereto.

The novel compounds of Formula V are useful as intermediates in the preparation of the non-steroidal hormonal agents of the present invention.

Illustrative of the starting materials of Formula II for the process of this invention are the following 1-(2H)-3,4-dihydronaphthalenones, namely 3,4-dihydronaphthalenone;
3,4-dihydro-5-chloro-6-methoxynaphthalenone;
3,4-dihydro-7-chloro-6-methoxynaphthalenone;
3,4-dihydro-5-fluoro-6-methoxynaphthalenone;
3,4-dihydro-7-fluoro-6-methoxynaphthalenone;
3,4-dihydro-6-hydroxynaphthalenone;
3,4-dihydro-6-methoxy-2-propylnaphthalenone;
3,4-dihydro-6-(tetrahydropyran-2-yl)-oxynaphthalenone;
3,4-dihydro-3-methylnaphthalenone;
3,4-dihydro-5-methylnaphthalenone;
3,4-dihydro-7-methylnaphthalenone;
3,4-dihydro-3-methyl-2-propylnaphthalenone; and
3,4-dihydro-7-propylnaphthalenone.

The starting materials of Formula II, wherein $R^1$ is lower alkoxy or cycloalkoxy, are prepared from a corresponding hydroxy compound, i.e. Formula II, wherein $R^1$ is hydroxy, by the alkylation procedure as described hereinabove. The starting materials of Formula II, wherein $R^1$ is 2-dialkylaminoethoxy, 2-piperidinoethoxy, 2-pyrrolidinoethoxy or 2-morpholinoethoxy, are prepared from a corresponding hydroxy compound, i.e. Formula II, wherein $R^1$ is hydroxy, by an alkylation procedure as described hereinabove. The starting materials of Formula II, wherein $R^1$ is tetrahydropyran-2'-yloxy are prepared from a corresponding hydroxy compound as described hereinabove by treatment with dihydropyran in the presence of an acid catalyst, such as p-toluenesulfonic acid or p-toluenesulfonyl chloride, in an inert solvent, such as benzene.

The Wittig reagents of Formula III are prepared according to conventional procedures, such as (Trippett, S., Advances in Organic Chemistry, vol. I, pp. 83–102; Trippett, S. Quarterly Reviews, vol. 16–17, pp. 406–440 (1962-1963), and Greenwald, R., Chaykovsky, M., and Corey, E. J., J. Org. Chem., 28, 1128–1129 (1963)). Similarly, the Grignard reagents of Formula IV are prepared via conventional procedures known to those skilled in the art.

The following examples serve to illustrate but are not intended to limit the scope of the present invention.

PREPARATION A p-Bromomethylphenol

To 15 ml. of glacial acetic acid is added 4.7 g. of phenol and 3.5 g. of paraformaldehyde. The mixture is cooled to 0° C. and anhydrous hydrogen bromide is passed into the reaction mixture until the solution is saturated. During the addition, heat is evolved, and the rate is controlled so that the temperature of the mixture does not exceed 80° C. Near the saturation point, the suspended paraformaldehyde disappears and a clear solution results. The saturated solution is cooled and the reaction product precipitates from the solution. The solid product is filtered and recrystallized from heptane to yield p-bromomethylphenol.

PREPARATION B

Ether preparation

To a solution of 4.7 g. of phenol in 100 ml. of ethanol was added 22.4 g. of 25% sodium methoxide in methanol. After 10 minutes, 16.1 g. of N-(2-chloroethyl)-piperidine (obtained by neutralization of the corresponding hydrochloride) in 100 ml. of ethanol is added to the mixture. The mixture is refluxed for a period of 16 hours, cooled and filtered. The filtrate is concentrated in vacuo, taken up in ether and washed with water. After removing the ether, the residue is distilled through a short Vigreux column to yield phenyl 2-piperidinoethyl ether.

Utilizing the above procedure with one exception, namely substituting an equivalent amount of N-(2-chloroethyl)-pyrrolidine, N - (2-chloroethyl)-morpholine, and 1 - diethylamino-2-chloroethane for the above N- (2-chloroethyl)-piperidine, there are obtained the corresponding phenyl 2-pyrrolidinoethyl ether, phenyl 2-morpholinoethyl ether and 2-diethylaminoethyl ether, respectively. The above 1-diethylamino-2-chloroethane is prepared according to the procedure of Breslow et al., J. Am. Chem. Soc., 76, 1472 (1945).

PREPARATION C

Bromo and chloromethylation procedures

To 15 ml. of glacial acetic acid is added 4.7 g. of anisole and 3.5 g. of paraformaldehyde. The mixture is cooled to 0° C. and anhydrous hydrogen bromide is passed into the reaction mixture until the solution is saturated. During the addition, heat is evolved, and the rate is controlled so that the temperature of the mixture does not exceed 80° C. Near the saturation point, the suspended paraformaldehyde disappears and a clear solution results. The saturated solution is cooled and the reaction product precipitates from solution. The solid product is filtered and recrystallized from heptane to yield p-bromomethylanisole.

Utilizing the same procedure with one exception, namely replacing anisole with each of the following ethers, namely phenyl cyclopentyl ether;
phenyl diethylaminoethyl ether;
phenyl morpholinoethyl ether; and
phenyl piperidinoethyl ether;

there are obtained the corresponding p-bromomethyl compounds, namely p-bromomethylphenyl cyclopentyl ether;
p-bromomethylphenyl 2-diethylaminoethyl ether;
p-bromomethylphenyl 2-morpholinoethyl ether; and
p - bromomethylphenyl 2 - piperidinoethyl ether, respectively.

Utilizing the same procedure with one exception, namely substituting hydrogen chloride for hydrogen bromide in the above method, there are obtained the corresponding p-chloromethyl phenyl ethers.

PREPARATION D 2-dialkylaminoethoxy and 2-piperidinoethoxy starting materials

A solution of 3 g. of 6-hydroxy-3,4-dihydronaphthalenone and 2 g. of potassium carbonate in 50 ml. of acetone is added 2 g. of 1-diethylamino-2-chloroethane (prepared according to the procedure of Breslow, et al., J. of Am. Chem. Soc., 67, 1472 (1945)). The reaction mixture is heated at reflux for a period of 24 hours, cooled, filtered and the filtrate is evaporated to dryness. The residue is recrystallized from ethyl acetate:benzene to yield 6-(2-diethylaminoethoxy)-3,4-dihydronaphthalenone.

Using the same procedure and the same starting material, reaction with the following chloro compounds affords the indicated final products:

| Chloro compound | Final products |
|---|---|
| β-chloroethylpiperidine. | 6-(2-piperidino)-ethoxy-3,4-dihydronaphthalenone. |
| 1-dibutylamino-2-chloropropane. | 6-(2-dibutylaminoethoxy)-3,4-dihydronaphthalenone. |
| 1-dimethylamino-2-chloropropane. | 6-(2-dimethylaminoethoxy)-3,4-dihydronaphthalenone. |

PREPARATION E 5 and 7 halo-1(2H)-3,4-dihydronaphthalenone

A mixture of 5 g. of 6-methoxy-1(2H)-naphthalenone in 50 ml. of water and 5 ml. of concentrated sulfuric acid is cooled to 0° C. Fifteen milliliters of concentrated nitric acid is added dropwise while the temperature is maintained below 20° C. The mixture is held at 20° C. for a period of 30 minutes and then poured over 50 ml. of cracked ice. The product is separated by filtration, chromatographed on neutral alumina and recrystallized from ethanol:ethyl acetate to yield 5-nitro-6-methoxy-1(2H)-naphthalenone and 7 - nitro - 6 - methoxy-1(2H)-napthalenone.

A mixture of 2 g. of 5-nitro-6-methoxy-1(2H)-naphthalenone in 50 ml. of water and 5 ml. of concentrated hydrochloric acid is allowed to react with 5 g. of metallic tin. The reaction mixture is held at 25° C. for a period of four hours. At the end of the reaction, the mixture is filtered to remove inorganic salts and the aqueous solution is extracted with ether. The ether extract is dried and evaporated to yield 5 - amino - 5 - methoxy-1(2H)-naphthalenone.

In a similar fashion, the 7-nitro-6-methoxy-1(2H)-naphthalenone is converted to 7-amino-6-methoxy-1(2H)-naphthalenone.

A solution of 5 g. of 5-amino-6-methoxy-1(2H)-naphthalenone and 25 ml. of concentrated hydrochloric acid is allowed to react with 3 g. of sodium nitrite in 20 ml. of water. The reaction mixture is allowed to stand for three hours at 0° C. Cuprous chloride in 20 ml. of concentrated hydrochloric acid is added to the solution. The reaction mixture is warmed for ½ hour at 50° C. The aqueous phase is extracted with ether and the ether extract is dried and evaporated to dryness to yield 5-chloro-6-methoxy-1(2H)-naphthalenone.

In a similar fashion, the 7-amino-6-methoxy-1(2H)-naphthalenone is converted to the corresponding 7-chloro-6-methoxy-1(2H)-naphthalenone.

A cold solution of 3 g. of 5-amino-6-methoxy-1(2H)-naphthalenone in 15 ml. of 40% fluoroboric acid is diazotized by the addition of 3 g. of sodium nitrite, and the solid being added in portions. The temperature of the reaction mixture is maintained below 10° C. during this addition. The reaction mixture is then allowed to stand at 10° C. for one hour, and is then warmed to 50° C. for ½ hour. The reaction mixture is poured into 50 ml. of ice water and the aqueous phase is extracted with ether. The ether extract is dried and evaporated to dryness to yield 5-fluoro-6-methoxy-1(2H)-naphthalenone.

In a similar fashion, the 7-amino-6-methoxy-1(2H)-naphthalenone is converted to the corresponding 7-fluoro-6-methoxy-1(2H)-naphthalenone.

EXAMPLE 1

1-(benzylidene) analogs

To a solution of 10 g. of triphenylphosphine in 50 ml. of benzene is added 9 g. of benzylbromide. The reaction mixture is allowed to stand at room temperature for two hours and the solid material is filtered and washed with benzene to yield benzyltriphenylphosphonium bromide. A mixture of 4 g. of the benzyltriphenylphosphonium bromide and 1 g. of phenyllithium in 40 ml. of anhydrous tetrahydrofuran is allowed to stand at 25° C. for a period of three hours. The tetrahydrofuran is removed by evaporation under reduced pressure and replaced with 40 ml. of xylene. To this mixture is added 1.5 g. of 6-hydroxy-3,4-dihydronaphthalenone and the reaction mixture is heated at reflux for 24 hours, then cooled and reduced to dryness under reduced pressure. The residue is washed with water, extracted with ether; the extract is dried and evaporated to dryness to yield 1-benzylidene-6-hydroxy-3,4-dihydronaphthalene which is recrystallized from ethyl acetate:petroleum ether.

Utilizing the same procedure, the following starting materials, namely 5-chloro-6-methoxy-3,4-dihydronaphthalenone;
7-chloro-6-methoxy-3,4-dihydronaphthalenone;
7-fluoro-6-methoxy-3,4-dihydronaphthalenone; and
5-fluoro-6-methoxy-3,4-dihydronaphthlenone;

are converted to the corresponding 1-(benzylidene) analogs, namely

1 - benzylidene - 5 - chloro-6-methoxy-3,4-dihydronaphthalene;
1 - benzylidene - 7 - chloro-6-methoxy-3,4-dihydronaphthalene;
1 - benzylidene - 7 - fluoro-6-methoxy-3,4-dihydronaphthalene; and
1 - benzylidene - 5 - fluoro-6-methoxy-3,4-dihydronaphthalene, respectively.

EXAMPLE 2

1-(p-hydroxybenzylidene) analogs

To a solution of 10 g. of triphenylphosphine in 50 ml. of benzene, is added 10 g. of p-bromomethylphenol. The reaction mixture is allowed to stand at room temperature for two hours and the solid material is filtered and washed with benzene to yield p-hydroxybenzyltriphenylphosphonium bromide. A mixture of 4 g. of the p-hydroxybenzyltriphenylphosphonium bromide and 3 g. of sodium ethoxide in 40 ml. of dimethylformamide is allowed to stand for three hours. The dimethylformamide is removed by evaporation under pressure and replaced with 40 ml. of xylene. To this mixture is added 1.5 g. of 6-hydroxy-3,4-naphthalenone and the reaction mixture is heated at reflux for 24 hours, then cooled and reduced to dryness under reduced pressure. The residue is washed with water, extracted with ether; the extract is dried and evaporated to dryness to yield 1-(p-hydroxybenzylidene)-6-hydroxy-3,4-dihydronaphthalenone which is recrystallized from ethyl acetate:petroleum ether.

Utilizing the same procedure, the following starting materials, namely 5-chloro-6-methoxy-3,4-naphthalenone;
7-chloro-6-methoxy-3,4-dihydronaphthalenone;
7-chloro-6-methoxy-3,4-naphthalenone; and
5-fluoro-6-methoxy-3,4-dihydronaphthalenone;

are converted to the corresponding 1-(p-hydroxybenzylidene) analogs, namely 1-(p-hydroxybenzylidene)-5-chloro-6-methoxy-3,4-dihydronaphthalene;
1-(p-hydroxybenzylidene)-7-chloro-6-methoxy-3,4-dihydronaphthalene;
1-(p-hydroxybenzylidene)-7-chloro-6-methoxy-3,4-dihydronaphthalene; and
1-(p-hydroxybenzylidene)-5-fluoro-6-methoxy-3,4-dihydronaphthalene, respectively.

EXAMPLE 3

2-dialkylaminoethoxy and 2-pyrrolidinoethoxybenzylidene analogs

To a solution of 3 g. of 6-methoxy-1-(p-hydroxybenzylidene)-3,4-dihydronaphthalenone and 2 g. of potassium carbonate in 50 ml. of acetone is added 2 g. of 1-diethylamino-2-chloroethane (prepared according to the procedure of Breslow, et al., J. of Am. Chem. Soc., 67, 1472 (1945)). The reaction mixture is heated at reflux for a period of 24 hours, cooled and evaporated to dryness. The residue is recrystallized from ethyl acetate:benzene to yield 1 - (2-diethylaminoethoxy)benzylidene-6-methoxy-3,4-dihydronaphthalene.

Utilizing the same procedure with one exception, namely substituting a molar equivalent, each of the following amines (prepared according to the procedure of Breslow, et al., J. of Am. Chem. Soc., 67, 1472 (1945)), namely 1-dimethylamino-2-chloroethane; and
1 - dibutylamino - 2 - chloroethane, there are obtained the corresponding dialkylaminoethoxy final products, namely 1-(2-dimethylaminoethoxy)-benzylidene-6-methoxy-3,4-dihydronaphthalene; and
1-(2-dibutylaminoethoxy)-benzylidene-6-methoxy-3,4-dihydronaphthalene, respectively.

In a similar fashion, by using the same procedure and starting material and substituting β-chloroethylpyrrolidine for the above 1-diethylamino-2-chloroethane, there is obtained the corresponding 2-pyrrolidinoethoxy compound, namely 1-(2-pyrrolidinoethoxy)-benzylidene-6-methoxy-3,4-dihydronaphthalene.

EXAMPLE 4

Grignard preparation

A solution of 5 g. of 6-methoxy-3,4-dihydronaphthalenone in 250 ml. of thiophene-free benzene is treated with an equimolar amount of benzylmagnesium bromide in anhydrous ether. The mixture is heated at reflux under anhydrous conditions for three hours, cooled and cautiously treated with an excess of aqueous ammonium chloride solution. This mixture is extracted with excess ammonium chloride solution. This mixture is then extracted with ethyl acetate and these extracts are in turn washed with water, dried over sodium sulfate and evaporated to dryness to yield 1-benzylidene-6-methoxy-3,4-dihydronaphthalene which is recrystallized from ethyl acetate:petroleum ether.

Utilizing the above procedure,

7 - chloro - 6-methoxy-3,4-dihydronaphthalenone is converted to
1-benzylidene-7-chloro-6-methoxy-3,4-dihydronaphthalene.

EXAMPLE 5 tetrahydropyran-2'-yl ethers

To a slurry of 1.0 g. of sodium hydride in 10 ml. of dry diethyleneglycol dimethyl ether under a dry nitrogen atmosphere is slowly added 1.0 g. of 1-(p-hydroxybenzylidene)-6-hydroxy-3,4-dihydronaphthalene in 10 ml. of dry diethyleneglycol dimethyl ether in a dropwise fashion over a 20 minute period. To this mixture is added dropwise, 0.9 g. of 2-chlorotetrahydropyran over a 10 minute period.

The mixture is stirred at room temperature for an additional 30 minutes and then cautiously added to an ice-water mixture with stirring. The organic phase is extracted with diethyl ether, dried and evaporated under reduced pressure to yield 1-[p-(tetrahydropyran-2'-yloxy)-benzylidene] - 6 - (tetrahydropyran-2'-yloxy)-3,4-dihydronaphthalene which may be further purified via recrystallization from acetone:hexane.

EXAMPLE 6 alkyl and cycloalkyl ethers

A solution of one equivalent of 1-benzylidene-6-hydroxy-3,4-dihydronaphthalene in 30 ml. of benzene is heated to reflux and about 2 ml. removed by distillation to eliminate moisture. The mixture is cooled to room temperature and two equivalents of sodium hydride are added, followed by the dropwise addition of two equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1-benzylidene-6-cyclopentyloxy-3,4-dihydronaphthalene which is further purified upon recrystallization from pentane.

Utilizing the above procedure and starting materials but substituting a molar equivalent of methyl chloride for cyclopentyl bromide, there is obtained the corresponding methyl ether, namely 1-benzylidene-6-methoxy-3,4-dihydronaphthalene.

EXAMPLE 7

Wittig reaction—methylsulfinyl carbanion method

To a mixture of 1 g. of sodium hydride in 20 ml. of pentane under an inert atmosphere, is slowly added 50 ml. of dimethylsulfoxide and the reaction mixture is heated at 75–80° C. for 45 minutes and then cooled to afford a solution of methylsulfinyl carbanion. To this solution is added 17 g. of benzylidenetriphenylphosphonium bromide and 40 ml. of dimethylsulfoxide and the mixture is held at room temperature for 10 minutes. The solvent is then removed by evaporation under reduced pressure and replaced with 40 ml. of xylene. To this mixture is added 8 g. of 6-hydroxy-3,4-dihydronaphthalenone and the resulting mixture is allowed to stir at room temperature for an additional 30 minutes. The reaction mixture is then poured into 50 ml. of ice water and extracted with ether. The organic phase is washed with water, dried and evaporated to dryness and recrystallized from ethyl acetate:petroleum ether to yield 1-benzylidene-6-hydroxy-3,4-dihydronaphthalene.

EXAMPLE 8

Bis ethers

A solution of one equivalent of 1-(p-hydroxybenzylidene)-6-hydroxy-3,4-dihydronaphthalene in 30 ml. of benzene is heated to reflux and about 2 ml. removed by distillation to eliminate moisture. The mixture is cooled to room temperature and two equivalents of sodium hydride are added, followed by the addition of two equivalents of methyl chloride in 10 ml. of benzene over a period of 20 minutes. The mixture is allowed to reflux for 20 hours after which time the precipitate of sodium chloride is removed by filtration and the organic phase dried and evaporated to yield 1-(p-methoxybenzylidene)-6-methoxy- 3,4-dihydronaphthalene which is further purified upon recrystallization from pentane.

Utilizing the above procedure, the same starting material is alkylated with the indicated chloro compounds to afford the following final products:

| Chloro compound: | Final product |
|---|---|
| 1 - dimethylamino - 2-chlorethane. | 1-[p - (2' - dimethylaminoethoxy) - benzylidene]-6-(2'-dimethylaminoethoxy)-3,4-dihydronaphthalene. |
| β - chloroethylpyrrolidine. | 1-[p - (2-pyrrolidinoethoxy)-benzylidene] - 6 - (2'-pyrrolidinoethoxy) - 3,4-dihydronaphthalene. |

EXAMPLE 9

Bis piperidinoethoxy ethers

To a solution of 10 g. of triphenylphosphine in 50 ml. of benzene is added 10 g. of p-bromomethylphenyl-2-piperidinoethyl ether. The reaction mixture is allowed to stand at room temperature for two hours and the solid material is filtered and washed with benzene to yield p-(2-piperidinoethoxy)-benzyltriphenylphosphonium bromide. A mixture of 4 g. of the latter phosphonium bromide and 1 g. of phenyl lithium in 40 ml. of anhydrous tetrahydrofuran is allowed to stand at 25° C. for a period of three hours. The tetrahydrofuran is removed by evaporation under reduced pressure and replaced with 40 ml. of xylene. To this mixture is added 6-(2'-piperidinoethoxy)-3,4-dihydronaphthalenone and the reaction mixture is heated at reflux for 24 hours, cooled and reduced to dryness under reduced pressure. The residue is washed with water, extracted with ether; the extract is dried and evaporated to dryness to yield 1-[p-2'-piperidinoethoxy)-benzylidene]-6-(2'-piperidinoethoxy) - 3,4-dihydronaphthalene.

EXAMPLE 10

Bis 2-dialkylaminoethoxy ethers

To a solution of 10 g. of triphenylphosphine in 50 ml. of benzene is added 10 g. of p-bromomethylphenyl 2-dimethylaminoethyl ether. The reaction mixture is allowed to stand at room temperature for two hours and the solid material is filtered and washed with benzene to yield p-(2'-dimethylaminoethoxy)-benzyltriphenylphosphonium bromide. A mixture of 4 g. of the latter phosphonium bromide and 1 g. of phenyl lithium in 40 ml. of anhydrous tetrahydrofuran is allowed to stand at 25° C. for a period of three hours. The tetrahydrofuran is removed by evaporation under reduced pressure and replaced with 40 ml. of xylene. To this mixture is added 6-(2'-dimethylaminoethoxy)-3,4-dihydronaphthalenone and the reaction mixture is heated at reflux for 24 hours, cooled and reduced to dryness under reduced pressure. The residue is washed with water, extracted with ether; the extract is dried and evaporated to dryness to yield 1-[p-(2'-dimethylaminoethoxy) - benzylidene] - 6-(2'-dimethylaminoethoxy)-3,4-dihydronaphthalene.

What is claimed is:

1. A compound of the following formula:

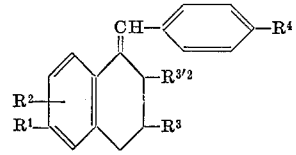

wherein $R^1$ is hydrogen, hydroxy, lower alkyloxy, cycloalkoxy, 2-dialkylaminoethoxy, 2-piperidinoethoxy, 2-pyrrolidinoethoxy, 2-morpholinoethoxy or tetrahydropyran-2'-yloxy;

$R^2$ is hydrogen, lower alkyl, chloro or fluoro;

each of $R^3$ and $R^{3'}$ independently is hydrogen or lower alkyl; and $R^4$ is hydroxy, lower alkyloxy, cycloalkoxy, 2-dialkylaminoethoxy, 2-piperidinoethoxy, 2-pyrrolidinoethoxy, 2-morpholinoethoxy or tetrahydropyran-2'-yloxy.

2. A compound according to claim 1 wherein each of $R^2$ and $R^{3'}$ is hydrogen; and $R^3$ is hydrogen or methyl.

3. A compound according to claim 1 wherein $R^2$ is 7-chloro or 7-fluoro; and each of $R^3$ and $R^{3'}$ is hydrogen.

4. A compound according to claim 1 wherein $R^2$ is 5-chloro or 5-fluoro; and each of $R^3$ and $R^{3'}$ is hydrogen.

5. A compound according to claim 2 wherein each of $R^1$ and $R^4$ is methoxy; and $R^3$ is hydrogen.

6. A compound according to claim 2 wherein each of $R^1$ and $R^4$ is 2-dimethylaminoethoxy; and $R^3$ is hydrogen.

7. A compound according to claim 2 wherein each of $R^1$ and $R^4$ is 2-pyrrolidinoethoxy; and $R^3$ is hydrogen.

8. A compound according to claim 2 wherein $R^1$ is methoxy; $R^3$ is hydrogen; and $R^4$ is 2-dimethylaminoethoxy.

9. A compound according to claim 2 wherein $R^1$ is methoxy; $R^3$ is hydrogen; and $R^4$ is 2-pyrrolidinoethoxy.

10. A compound according to claim 2 wherein $R^1$ is 2-pyrrolidinoethoxy; $R^3$ is hydrogen; and $R^4$ is methoxy.

11. A compound according to claim 2 wherein $R^1$ is 2-dimethylaminoethoxy; $R^3$ is hydrogen; and $R^4$ is me-aminoethoxy.

12. A compound according to claim 2 wherein $R^1$ is 2-dimethylaminoethoxy; $R^3$ is hydrogen; and $R^4$ is methoxy.

13. A compound according to claim 2 wherein $R^1$ is 2-dimethylaminoethoxy; $R^3$ is hydrogen; and $R^4$ is 2-pyrrolidinoethoxy.

References Cited

UNITED STATES PATENTS 3,313,853   4/1967   Lednicer _____ 260—570.7

OTHER REFERENCES

Fahim et al., J. Org. Chem. vol. 25, pages 1040 to 1041 (1960).

JOHN D. RANDOLPH, Primary Examiner

U.S. Cl. X.R.

260—570.7, 668, 345.9, 294.7, 326.5, 247.7, 619, 612, 999, 606.5, 293, 590, 247, 583, 649, 326.8

UNITED STATES PATENT OFFICE
CERTIFICATE OF CORRECTION

Patent No. 3,506,653        Dated   April 14, 1970

Inventor(s)  John H. Fried

It is certified that error appears in the above-identified patent and that said Letters Patent are hereby corrected as shown below:

Column 1, lines 18 through 24, Formula (I) should appear as follows:

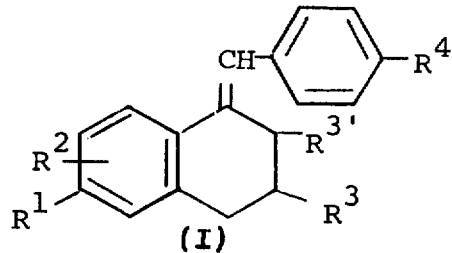

Column 10, lines 3 though 9, formula in Claim 1 should appear as follows:

UNITED STATES PATENT OFFICE
CERTIFICATE OF CORRECTION

Patent No. 3,506,653    Dated April 14, 1970

Inventor(s)  John H. Fried

It is certified that error appears in the above-identified patent and that said Letters Patent are hereby corrected as shown below:

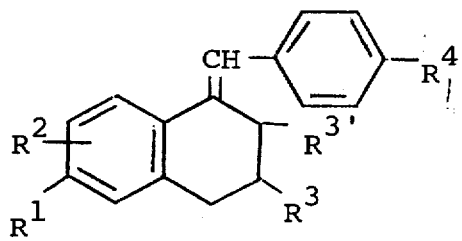

Column 10, line 11, "2'-dialkylaminoethoxy" should read --2-dialkylaminoethoxy--.

Column 10, line 41, "dimethylaminoethoxy" should read --pyrrolidinoethoxy--.

Column 10, lines 41 and 42, "meaminoethoxy" should read --dimethylaminoethoxy--.

Signed and sealed this 10th day of November 1970.

(SEAL)
Attest:

EDWARD M. FLETCHER, JR.
Attesting Officer

WILLIAM E. SCHUYLER, JR.
Commissioner of Patents